US010643261B2

(12) United States Patent
Kressler (10) Patent No.: US 10,643,261 B2
(45) Date of Patent: *May 5, 2020

(54) GIFTING SYSTEM

(71) Applicant: Joyce Kressler, Worcester, MA (US)

(72) Inventor: Joyce Kressler, Worcester, MA (US)

( * ) Notice: Subject to any disclaimer, the term of this patent is extended or adjusted under 35 U.S.C. 154(b) by 602 days.

This patent is subject to a terminal disclaimer.

(21) Appl. No.: 15/165,872

(22) Filed: May 26, 2016

(65) Prior Publication Data

US 2016/0328774 A1 Nov. 10, 2016

Related U.S. Application Data

(63) Continuation of application No. 13/907,844, filed on May 31, 2013, now Pat. No. 9,373,139, which is a continuation of application No. 11/863,694, filed on Sep. 28, 2007, now Pat. No. 8,478,661, which is a continuation-in-part of application No. 11/778,465, filed on Jul. 16, 2007, now abandoned, which is a (Continued)

(51) Int. Cl.
*G06Q 30/00* (2012.01)
*G06Q 30/06* (2012.01)
*G06Q 20/04* (2012.01)
*G06Q 20/28* (2012.01)
*G06Q 20/12* (2012.01)
*G06Q 20/40* (2012.01)

(52) U.S. Cl.
CPC ..... *G06Q 30/0621* (2013.01); *G06Q 20/0453* (2013.01); *G06Q 20/12* (2013.01); *G06Q 20/28* (2013.01); *G06Q 20/4014* (2013.01); *G06Q 30/06* (2013.01)

(58) Field of Classification Search
CPC ............... G06Q 30/06; G06Q 30/0621; G06Q 20/0453; G06Q 20/28; G06Q 20/12; G06Q 20/4014
See application file for complete search history.

(56) References Cited

U.S. PATENT DOCUMENTS 6,372,073 B1 * 4/2002 Weder ............... A47G 7/085
156/209
7,861,441 B1 * 1/2011 Hoellwarth ........... B42D 15/08
229/92.8

(Continued)

OTHER PUBLICATIONS

"Best Buy's Imagelab Gives Great Options for Your Holiday Photos," Canada NewsWire (Ottawa), Dec. 14, 2005 (Year: 2005).*

*Primary Examiner* — Anne M Georgalas
(74) *Attorney, Agent, or Firm* — Nixon Peabody, LLP; David F. Crosby (57) ABSTRACT

A system for purchasing and delivering a specific gift, in which, at the time of the purchase, the buyer, instead of being provided with the gift, is provided with a gift proxy or special package which includes a gift token which includes an authentication device. The gift proxy also includes a picture of the specific gift. The buyer delivers the gift proxy to the recipient. At a future time and place, not necessarily pre-determined, the recipient provides the gift proxy to the seller, the seller authenticates the gift proxy, and the recipient receives the gift from the seller. A centralized and networked order management system monitors the gift tokens. The system can be online and/or store oriented, and can be used to transact in goods and/or services other than gifts.

6 Claims, 7 Drawing Sheets

Related U.S. Application Data continuation-in-part of application No. 11/777,915, filed on Jul. 13, 2007, now abandoned.

(60) Provisional application No. 60/807,415, filed on Jul. 14, 2006.

(56) References Cited

U.S. PATENT DOCUMENTS

| | | | | |
|---|---|---|---|---|
| 2003/0061566 A1* | 3/2003 | Rubstein | ................ | G06Q 30/02 715/201 |
| 2004/0167819 A1* | 8/2004 | Keating | ................ | G06Q 20/20 705/16 |

* cited by examiner

GIFTING SYSTEM

CROSS-REFERENCE TO RELATED APPLICATIONS

This application claims the benefit under 35 U.S.C. § 119(e) of U.S. Provisional Application No. 60/807,415, filed Jul. 14, 2006, which is hereby incorporated by reference. Furthermore, this application is a continuation of and claims the priority benefit under 35 U.S.C. § 120, of non-provisional patent application Ser. No. 11/777,915, filed Jul. 13, 2007. Furthermore, this application is a continuation of and claims the priority benefit under 35 U.S.C. § 120, of non-provisional patent application Ser. No. 11/778,465, filed Jul. 16, 2007.

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention involves a system for purchasing and delivering goods and services.

BACKGROUND OF THE INVENTION

This invention is a sales and business process that supports the new gifting system. The process is not limited to gifts and can support any sales transaction that requires location shift and/or time delay.

This addresses a significant problem. In what has become a very mobile society, people frequently live or work apart from family members, friends and loved ones. While bridal/baby showers, engagement parties, weddings, graduations, and other significant occasions marked by gift-giving occur in one city, often those with whom these experiences are shared reside in another. This necessitates either transporting gifts from one location to another, mailing them, exchanging/returning them or storing them—all of which are inconvenient in varying degrees. Additionally, large or cumbersome gifts pose problems for transport whether being given locally or at a distance.

The traditional sales process involves two parties: a buyer and a seller involved in a two-phase transaction: order and fulfillment. This applies to in-store sales as well as catalog and on-line shopping. In-store sales connect the two steps and fulfillment happens immediately after payment, while on-line and catalog buyers wait for a few days for delivery. Sometimes fulfillment is delayed because of inventory issues, need for customization, or other reasons, but in general, sellers start fulfillment as soon as the order is placed and try to complete it with minimum or no delay.

Figure 1:
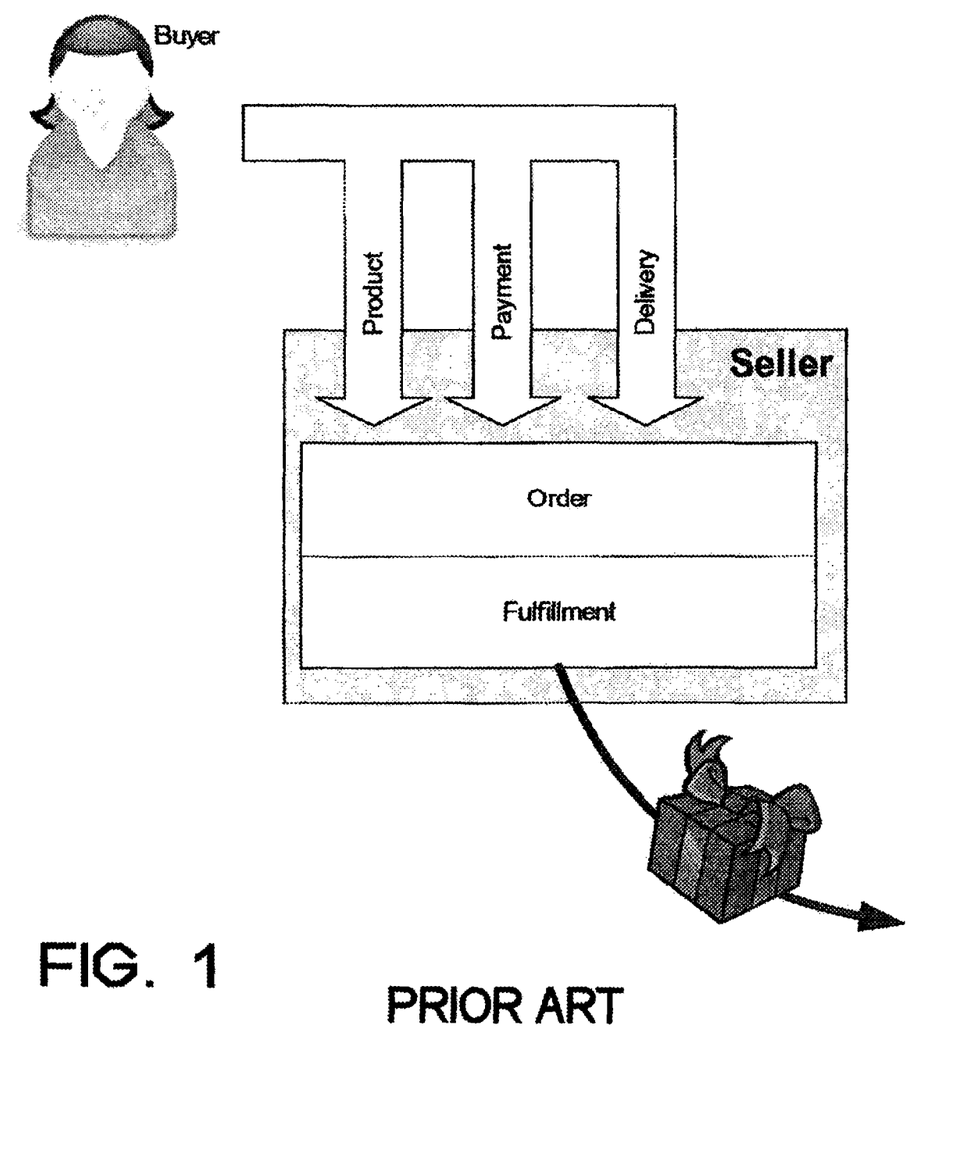
FIG. 1 is a diagrammatic representation of the prior art conventional process for purchasing products and gifts.

The following are characteristics of the current process as represented by FIG. 1. 1. The transaction involves two sides: a buyer and a seller. 2. All the required information for order and fulfillment is collected from the buyer at the time of order. 3. Fulfillment starts immediately after the order is placed; it is performed by the seller, and should be completed as soon as possible.

The current process works well most of the time, but with some limitations. One of those limitations occurs when the desired time and place for delivery are unknown or assumed incorrectly, or a product is back-ordered, or an item is too large to transport by an individual.

For example, in the case of wedding gifts, many couples might prefer to delay the delivery of gifts and presents until after the wedding and the honeymoon; especially if the wedding ceremony is not taking place in the area where they plan to live.

As another example, in home renovation and remodeling, many home improvement projects fall behind schedule. One may want to order new kitchen appliances in advance but keep the delivery time open until the kitchen is ready.

These and other difficulties experienced with the prior art devices have been obviated in a novel manner by various embodiments of the present invention.

It is, therefore, an outstanding object of some embodiments of the present invention to provide a gifting system that significantly reduces the logistical burdens of providing gifts to remote recipients or for those who would prefer to delay receipt of a gift.

Another object of some embodiments of this invention is to provide a gifting system that maintains all of the psychological benefits of conventional gifting procedures.

A further object of some embodiments of the present invention is to provide a gifting system that expands the variety of gifts that can be practically considered in connection with a particular gift-giving situation.

It is another object of some embodiments of the invention to provide a gifting system that simplifies and eases the retailers inventory challenges.

It is a further object of some embodiments of the invention to provide a gifting system that simplifies and reduces the security oriented delays and inconveniences associated with transportation.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION

This invention is a system for purchasing and delivering a specific gift or other purchase, in which, at the time of the purchase, the buyer, instead of being provided with the gift, is provided with a gift proxy or special package which includes a gift token which includes an authentication device or token. The gift proxy is designed to look like an attractively packaged gift with the exterior bearing the brand identity of the retailer and includes a picture of the specific gift selected by the buyer. The buyer delivers or sends the gift proxy to the recipient. The recipient provides the gift proxy to the seller, the seller authenticates the gift retailer and the recipient receives the gift from the seller. An order management system monitors the gift tokens.

BRIEF DESCRIPTION OF THE DRAWINGS

The character of the invention, however, may best be understood by reference to one of its structural forms, as illustrated by the accompanying drawings, in which.

DETAILED DESCRIPTION OF THE INVENTION

The Concept of this invention is to eliminate the inconvenience of transporting gifts or other purchases by development of a gifting system that generates a reduced high quality image of the chosen gift within a box, card or other packaging form, thus allowing the purchaser to actually select a specific item (for instance, one on a registry) and present—or mail—its facsimile or gift proxy at or in time for the required occasion. Upon opening, the gift of choice is revealed in miniature. In its simplest form, this is a variation of a redeemable store credit, except that it maintains the character and benefits of a specifically chosen gift, as opposed to the impersonal nature of a generic redeemable store credit. This is a gift card "on steroids."

The activation of this gifting system would involve the generation of a miniature facsimile of a product/gift along with pertinent details of purchase, purchaser, and redemption procedure contained within a box or box-like form, alternate packet, package or envelope construction. No matter what the actual size of the item purchased is, the gift proxy contents would contain a miniaturized representation (size to be determined but hand-held in scale). There are unlimited variations for the construction, presentation and shape of the gift proxies, and they can be in 2- or 3-dimensional formats such as round/cylindrical, triangular/pyramid, square/cube, rectangular or any invented forms that can either mimic existing identity of a specific store or merchandiser or used to create a new branding opportunity. All versions contain a high quality reproduction of product to be purchased, in a form that vendor wishes to use, including but not limited to a photograph, a hologram or a 3-D image. Materials for the gifting system include but are not limited to paper, card stock, plastic, plastic-coated paper or other flexible sources.

Examples of gifting systems include the following types. First: A 2-dimensional printable version easily assembled into a 3-dimensional construction so that all elements are self-contained in one-piece construction. When the lid is lifted or the envelope unfolds, the image and all other pertinent information appear as part of the construction. The interior contains a gift image, redemption and tracking information; the exterior takes on the characteristics and/or graphic design of the vendor from which it is generated.

Second: A 2-piece construction with the first part pre-printed with essential generic information for each purchase such as store or vendor branding, tracking information and redemption policy; the second part would be exclusively for the gift segment to be inserted/assembled at the time of purchase containing product information, inventory control data, bar-coding or other tracking method (such as RFID).

Third: A decorative tamper-proof card with photo or graphic image of the item and all pertinent information generated at point of purchase or at the cashier that can be inserted into a small box or envelope. (This card would be larger, perhaps similar to a postcard, and could replace the generic gift cards that are presently available at most retailers.)

Fourth: A separate box that, once assembled, has the reduced image of the produce/gift and information inserted separately, attached by a self-adhering removable back, tape or similar material. This actual image can be set either flush with box or can have an adhesive disk or some other construction that permits the item to stand away from the back of the box and appear 3-dimensional. A holographic image can be produced for similar effect.

Fifth: Similar elements could be used in a version of a "pop-up" card.

Sixth: In addition to physical on-site retail locations, the gift system could also be accessed via the web, for example directly through retailers or through sites such as the weddingchannel.com (central online site linking major participating retailers like Tiffany's®, Bloomingdale's®, Crate & Barrel®, Williams Sonoma®, etc. and all consumers who have registered with those retailers) The gift system ordered online could be sent to either the giftee or the giftor.

Seventh: Ultimately, the gift or item could be available via home access to be purchased directly, online printed, and assembled at the purchaser's site.

In any preferred embodiment of the invention, each complete unit can be self-contained with information concerning the purchase within the gift proxy and token including: First, the system provides a high quality image of item (photo, hologram, other). Second, the system provides a written description and/or stock number or other identification. Third, the system provides information about redemption and credit policy. Fourth, the system provides information about the availability of product, i.e. store, internet, etc. Fifth, the system provides an area for gift message to recipient. Sixth, the system provides an encrypted coding or number system to prevent counterfeiting and theft. Seventh, the system provides internal retailer's inventory management system. Eighth, the system provides the ability of retailer to skew (variance monitoring) for store performance. All embodiments can be tailored to reflect vendor brand and/or logo.

Retailer Advantages of the preferred embodiment of the invention: First, the system saves TIME and MONEY. Second, the system provides a consumer-friendly experience. Third, the system identifies retail outlet where purchased—branding. Fourth, the system assists with inventory management. Fifth, the system captures purchaser information. Sixth, the system reduces costs of packing materials. Seventh, the system reduces additional freight/mailing costs. Eighth, the system eliminates time/labor for packing/gift wrapping. Ninth, the system reduces time/labor/costs for returns of actual items. Tenth, the system reduces time/labor/costs for re-crating of second-round purchase. Eleventh, the system reduces time and preparation costs for shipping of larger, heavier products. Twelfth, the system eliminates re-stocking of returns. Thirteenth, the system eliminates risk of damage in transit. Fourteenth, the system provides new opportunity for branding and marketing. Fifteenth, the system allows the time-saving and expense-saving measures reduce overhead costs. Sixteenth, the system overcomes risk of loss of sale if a specific registered gift is out of stock. Seventeenth, the system offers expanded opportunity for sales of larger gifts, such as furniture, because it eliminates transport issues to site of celebration or event.

Purchaser Advantages of the preferred embodiment of the invention: First, the system allows a user-friendly purchase. Second, the system provides a lightweight alternative, compared to heavy gift (e.g., Kitchenaid® mixer). Third, the system provides easy "gift" transport during travel, less cumbersome and unbreakable. Fourth, the system is able to provide personalized gift selection instead of generic credit. Fifth, the system provides visibility of gift when opening (the "Ah-h-h effect"). Sixth, the system provides additional savings recognized in less dollars spent for mailing charges as compared with cost for mailing actual (heavier) gift and insurance for same. Seventh, the system, if the token is mailed, reduces the risk of wrong or broken present being received. Eighth, the system makes it less likely that the token will be lost or misplaced as compared to gift cards. Ninth, the system is ideal for "destination wedding" gifts. Tenth, the system simplifies the giving of larger, more costly group gifts and transport of same to a party or event. Eleventh, the gifting system if more personalized than a generic gift card.

Recipient Advantages of the preferred embodiment of the invention: First, the system avoids transport issues and potential breakage or loss. Second, the system eliminates need for physical returns (schlep" factor or returns). Third, the system allows the transactions to be accomplished at a retailer location of choice and allows the recipient to redeem the gift at hi/her convenience. Fourth, the system connects a specific gift to specific giver. Fifth, the system is as versatile as a generic credit but more personal and has more cache. Sixth, the system records gift value/purchaser in the event of loss or misplacement. Seventh, the system avoids inconvenience of shipped gift arriving and no one at home to receive it (gift system can fit in mailbox). Eighth, the system eliminates "schlep factor" at the actual wedding, shower, or other gift-giving occasion.

Advantage for all parties of the preferred embodiment of the invention: Most gift-givers have a pre-set specific amount that they are prepared to spend. In choosing a gift, the cost for mailing a gift is often deducted from this total. With the new gift system alternative, no deduction for shipping costs is necessary which is a benefit for all parties concerned. The full amount can be applied which means that more money actually goes to the retailer and the recipient gets the benefit of a more expensive gift. Furthermore, reduction in usage of packaging materials is an environmental advantage as well.

Technical issues: The preferred embodiment of this invention would provide an anti-theft activation system which would prevent unauthorized duplication, counterfeiting, and theft of the tokens. Each token would carry an identification information device that carried token identification information. The token identification device might be a printed image, a computer chip, a radio frequency identification device (RFID), a magnetic imprint or other similar information storage technology. The anti-theft system would include a method for interrogating the token to read that token identification information. The anti-theft system would also include information storage in the order management system for keeping track of the activities in connection with a particular token.

The preferred embodiment of this invention would also include a tracking device connected through a network to a centralized data collection and processing system to protect and monitor the activity of individual tokens with auditing capabilities to establish compensation amounts in connection with licensing agreements. Although this tracking device system could be different from the above described anti-theft activation system, it could also employ the same infrastructure and simply employ specialized programming in the order management system so that all of the necessary royalty calculation information could be captured and maintained within the order management system.

Proposed sales/gifting system changes and improves the current sales process by allowing a buyer to place an order without the fulfillment information. The missing information is provided by a receiver at a future time. The receiver may be the buyer or any third party that is authorized by the buyer to complete the transaction.

The new sales system achieves new functionality by introducing the following changes to the current sales process. The system defines "Order" and "Fulfillment" as sequential, but separated processes. The system allows "Orders" with incomplete "Fulfillment" information. The system introduces a "Receiver" as a third party involved in the sales process. The system allows the Receiver to determine the time and place of delivery and provides it as an input to the fulfillment process. The system introduces a secure and safe mechanism to transfer control of the order from a buyer to a receiver. The system allows the Seller to be able to recognize and confirm both a buyer and a receiver of an order.

Definitions. In alphabetical order. Buyer is an individual that is ready to buy from a seller. The buyer determines what to buy and is responsible for payment. A buyer may be representing a business or an organization.

Delivery is the process of transferring the goods from the seller to the receiver. Delivery may be in hand at the time of order, store pickup, via shipping service, or electronically for digitized content like movies, music, etc.

Fulfillment is the second step in a sales process. It involves the information a buyer provides at the time of order and information from the receiver about where and when goods and services are delivered.

Order is the first step in a sales process. It involves information exchange between the seller and the buyer about the item(s) sold and payment.

Order Confirmation is a confirmation that an order was placed and paid for. It includes information needed in order to activate the fulfillment process.

Order Control Token is an object in the form of a card, picture, email message, a letter, or any other format that allows the buyer to transfer the control of the order to a receiver.

Payment is any method, cash, check, money order, credit card, electronic fund transfer, or any other legal method, used by the buyer and the seller to provide consideration for the sale.

Receiver is an individual or an organization that is authorized by a buyer to receive goods and services. The receiver determines when and where goods and service are delivered. A buyer may decide to take delivery of goods and/or services. In this case, he or she is both the buyer and the receiver.

Seller is a business, store, organization, web site, or individual that is offering goods or services for sale.

Process description: The following section describes the process of the new sales system as represented in FIGS. 2 through 5 and summarized in FIG. 6. This general process description applies to in store sale as well as on-line and other forms of sales transactions when goods and services are purchased. The process involves 4 major steps.

Figure 2:
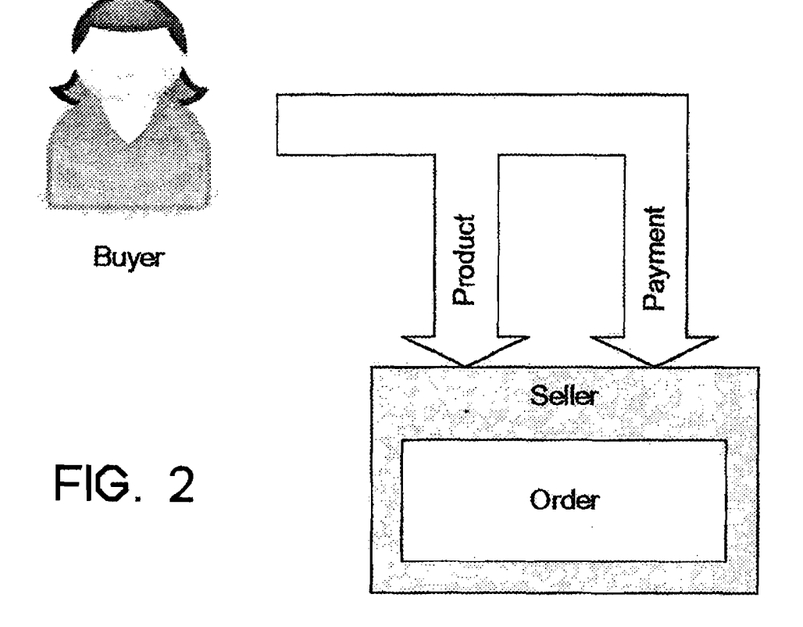
FIG. 2 is a diagrammatic representation of the first step in a purchase process embodying the principles of the present invention.

Step 1—Order placement: as represented in FIG. 2, a buyer places an order with the seller. The order includes the variety and quantity of item ordered as well as shipping, gift wrap, customization, state and local tax and any other information the seller needs to process the order.

Figure 3:
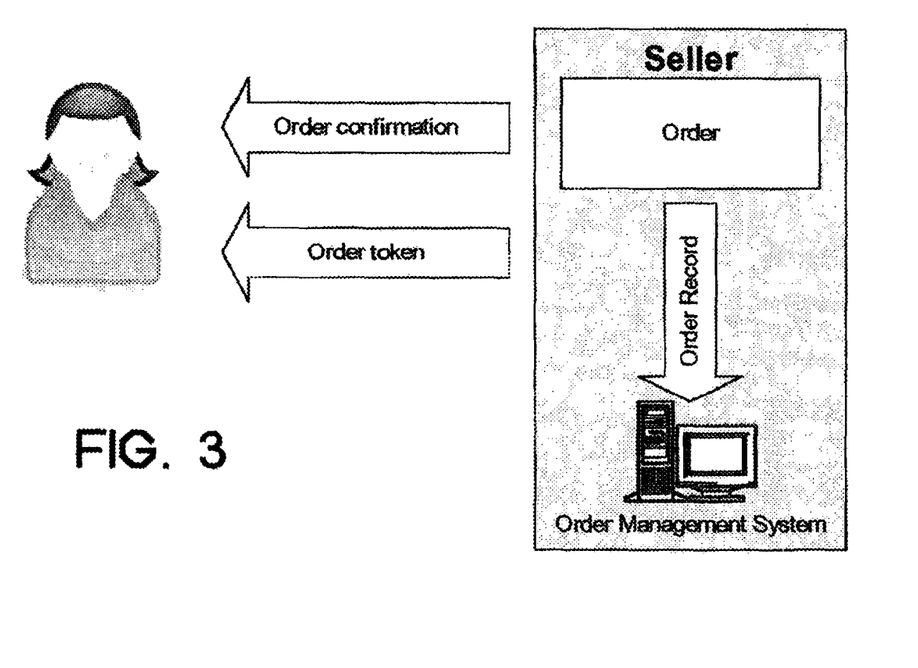
FIG. 3 is a diagrammatic representation of the second step in a purchase process embodying the principles of the present invention.

Step 2—Order Processing: as represented in FIG. 3, the seller processes the order. It involves accepting and approving payment, updates of inventory and financial records, creating records in the order management system for future processing, and generating a receipt and a control token for the buyer. The control token represents a device which gives the buyer the right and power to redeem the token for the purchased item in the future. In the preferred embodiment of this invention, the token would be part of a gift proxy design to convey the psychological elements of the specific gift selected by the buyer. However, the gift proxy would be compact and easily transported.

Figure 4:
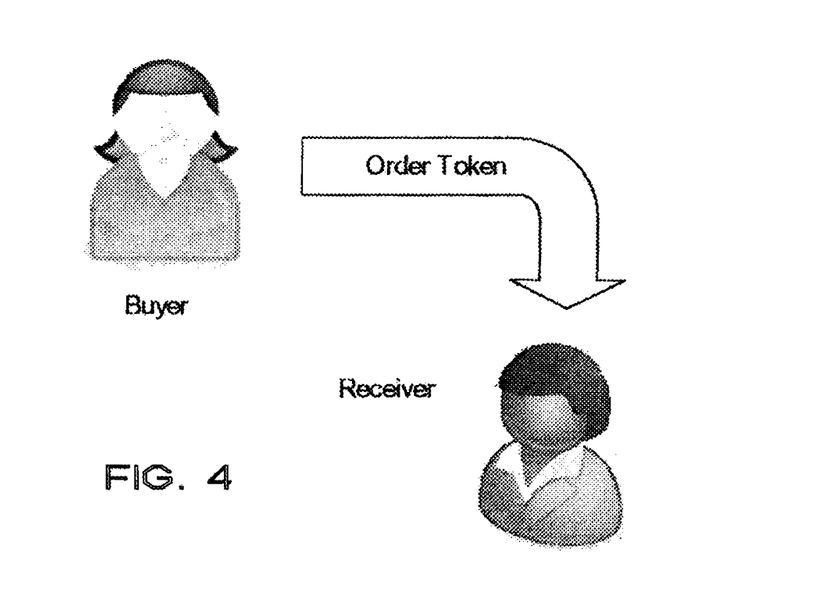
FIG. 4 is a diagrammatic representation of the third step in a purchase process embodying the principles of the present invention.

Step 3—Transfer of token: as represented in FIG. 4, this step is optional and happens only if the buyer decides to authorize a third party to be the receiver of the order. This can be in the form of a card, email, text message, etc. in the preferred embodiment of this invention, the gift proxy, including the token, would be conveyed to the gift recipient, either personally or by other means. In the preferred embodiment, the gift proxy, including the token would be presented to the gift recipient at a ceremony or similar gathering. In the alternative, the gift proxy can be mailed or sent to the recipient.

Figure 5:
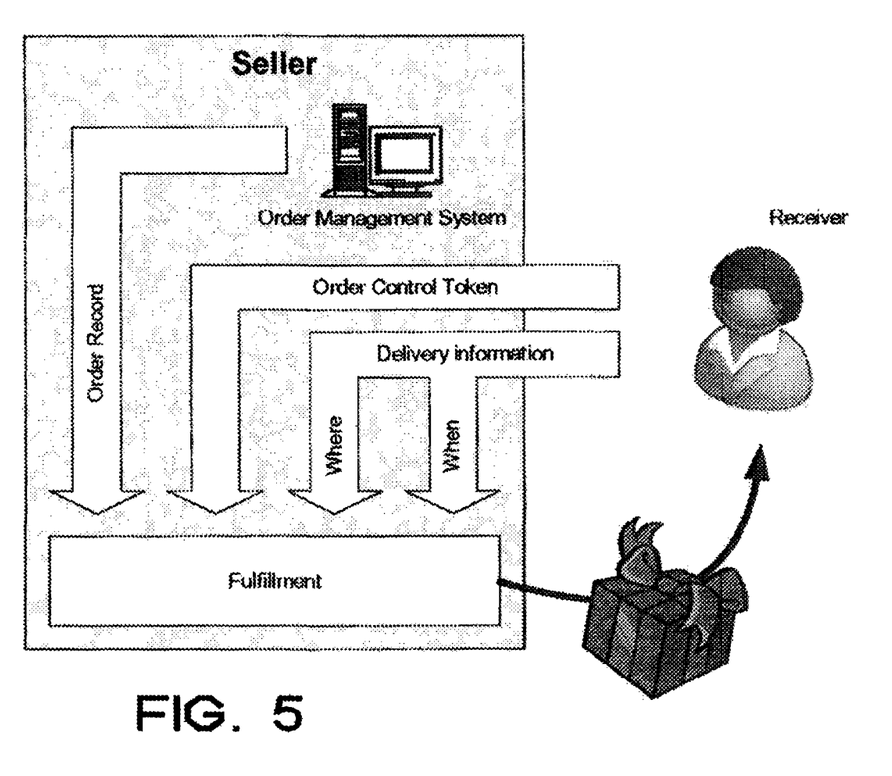
FIG. 5 is a diagrammatic representation of the fourth step in a purchase process embodying the principles of the present invention.

Step 4—Fulfillment Processing: As Represented in FIG. 5, fulfillment starts when the receiver or the holder of the "order token" initiates it. The seller uses input from the receiver as well as information stored in the order management system. Delivery may be a store pickup, shipping of goods, execution of a service, or electronic transfer of digitized content. Within the preferred embodiment of this invention in the order management system would be a national or international network of computers adapted to monitor the flow and processing of the tokens, to gather information about the tokens and assure the genuineness of the tokens. For example, the tokens could include holographic encrypted identification coding that could be very difficult, if not impossible to reproduce, and would assure the genuineness of the token.

Figure 6:
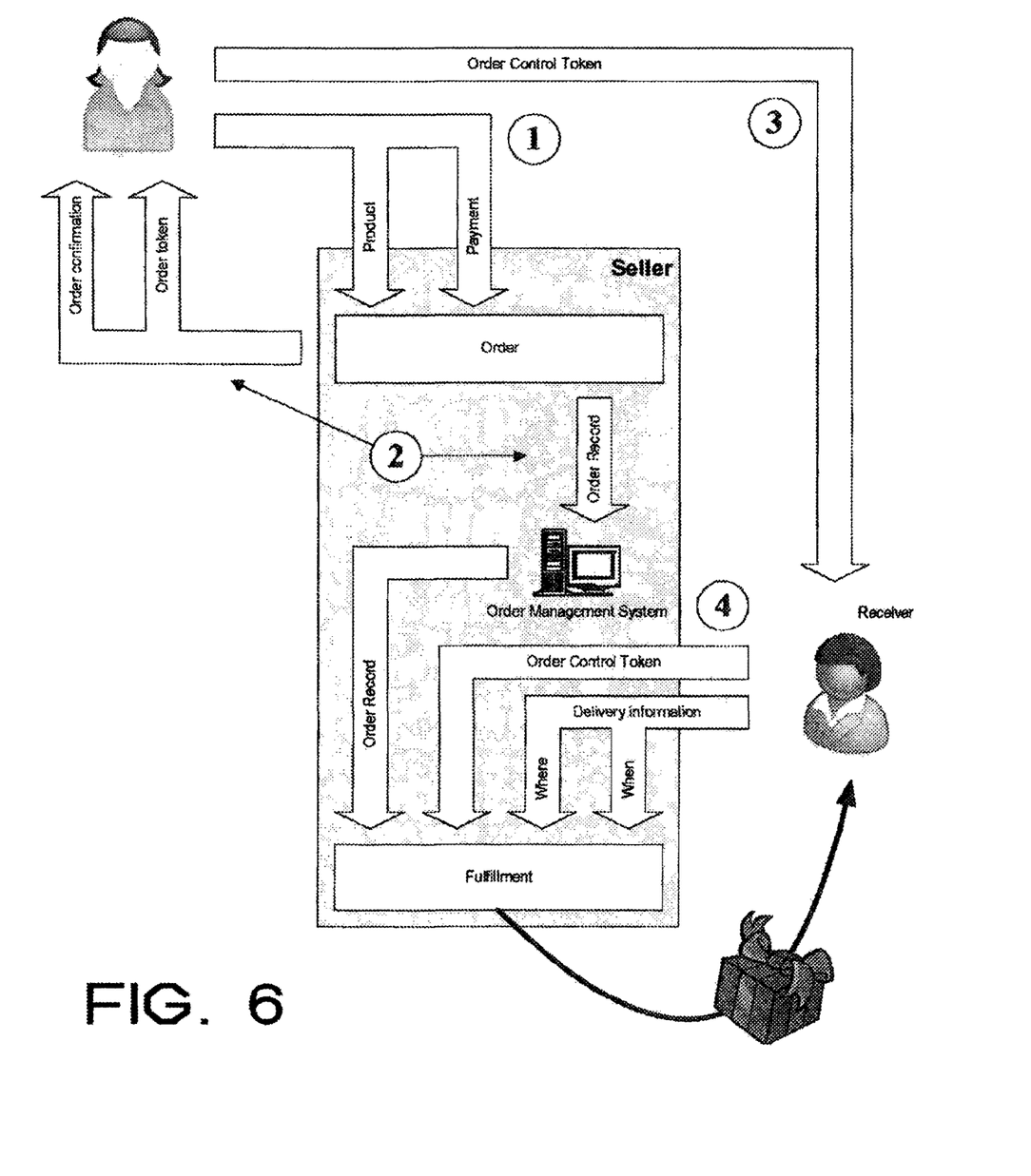
FIG. 6 is a diagrammatic representation showing all four steps in a purchase process embodying the principles of the present invention.

Full process view: as represented in FIG. 6, this diagram shows the flow of information between a buyer, a seller, and a receiver from the time an order is placed until goods are delivered.

Applications: The new sales process is not replacing the traditional sales process. For hose people who still prefer to go to a store to buy a gift, this new process expands heir options. However, the new sales process also provides an excellent solution that helps all parties (buyer, seller, and receiver) save time and money by being able to transact the purchase online.

Gifts: a gift is paid for by one person and received by another. Many times the act of giving is part of a ceremony associated with a special event like a birthday, baby shower, wedding, holiday, or other special occasions. However the time and place of celebration may not always be the most convenient for gift giving (or receiving). The new sales process preserves the ceremonial aspect of gift giving by allowing the packaging and delivery of the "order control token" in an appropriate format that enables the recognition (and appreciation) of the gift while allowing the recipient of the gift to choose when and where the gift is delivered.

Wedding Registry: The new sales process allows recipients to delay the delivery of gifts, an important service for couples who celebrate with friends and family away from home.

Corporate gifts: A company may select a holiday gift o reward for employees and let them pickup the gift at the local store, avoiding the cost of distribution and shipping.

Relocation: Redeem at the local store nearest final living destination.

Price Protection: Gift system value equals exact amount incurred by purchaser and can either be redeemed for specific gift or used in place of a gift card of equal value.

Customization issues: Like many other innovations, the new sales system can be customized to address the specific needs of the marketplace. The following terms and conditions are subject to variation and can be determined on a system-wide basis or can be determined at the discretion of individual retailers.

Sales tax: Sales tax is paid locally, based on place of delivery. In the preferred embodiment, the order management system would keep track of the sales tax associated with the delivery and charge the buyer for that tax.

Inventory issues: What happens when a seller is out of stock when the receiver asks for delivery? In that case, the preferred embodiment would allow the receiver to delay a fulfillment until the item is available or to select an alternative product of equal value.

Discontinued items: What happens when a seller is out of stock and can no longer order the item from the supplier? In that case, the preferred embodiment would allow the receiver to select an alternative product of equal value.

Fulfillment cost: What happens if buyer did not pay for shipping but the receiver wants the item delivered? In the preferred embodiment, the buyer would have the choice at the time of purchase of authorizing charging for shipping at the time of fulfillment or not. If the buyer authorizes the shipping charge, and the buyer will be charged at time of fulfillment. In that case, if there is no shipping charge, and the buyer will not be charged. If the buyer does not authorize charging for shipment, and then the receiver will be required to pay for shipping.

Time limit: For how long can a receiver wait before taking delivery? In the preferred embodiment, there might be time limits for redemption of specific gift item at which time the amount would convert to a store credit of equal amount.

Returns/Exchange: Who gets the credit? In the preferred embodiment, the receiver can return the token for store credit to be applied to items of recipient's choice of equal value.

Transfer: Can a gift be re-gifted? Sold to others? In the preferred embodiment, the token may or may not be transferable to another receiver at the discretion of the retailer.

Unclaimed items: How to process unclaimed items? In the preferred embodiment, the receiver needs to redeem the token within a window of time set forth by the retailer or laws governing a specific state.

Lost Token: How to handle claims for a lost "control token"? In the preferred embodiment, the order management control system will keep track of tokens and will allow a lost token to be replaced and the original token to be canceled.

Figure 7:
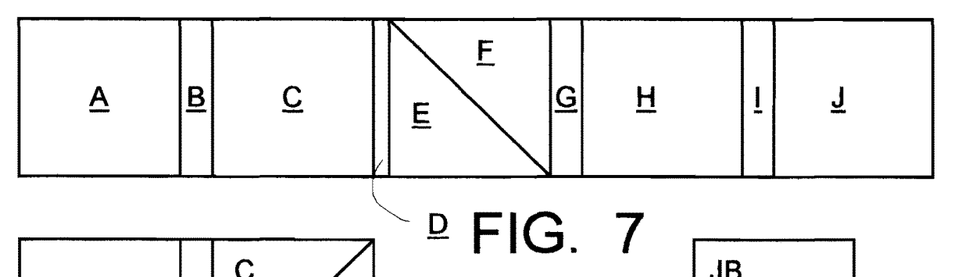
FIG. 7 is a diagram showing the initial form of the card stock used to form a first gift proxy embodying the principles of the present invention.

One embodiment of the gift proxy and token element is shown in FIGS. 7-15. FIG. 7 shows an elongated piece of card stock divided into sections by fold lines. Each section is designated by an underlined numeral and the back of each section is designated by the corresponding underlined numeral followed by an underline to B.

Figure 8:
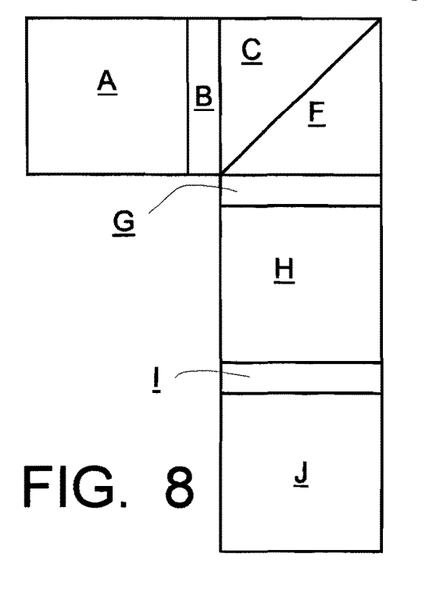
FIG. 8 is a diagram showing the first step in forming the first gift proxy from the card stock shown in FIG. 7.

FIG. 8 shows the card stock folded over at the fold lines between Section C and Section D, and between Section D and Section E, and a fold over between Section E and Section F, to form the back and front of a pocket between Section C and the hidden Section E (behind Section F).

Figure 9:
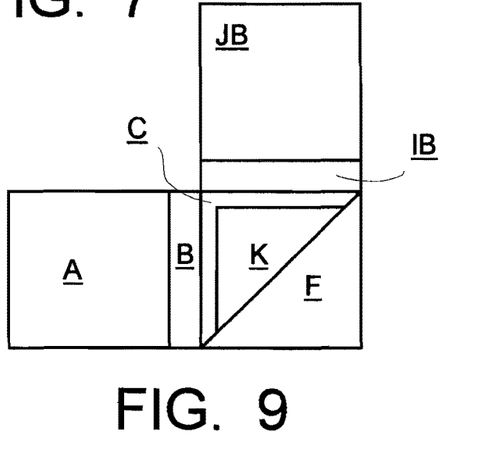
FIG. 9 is a diagram showing the second step in forming the first gift proxy from the card stock shown in FIG. 7.

FIG. 9 shows the result of folding on fold lines between Section F and Section G, and between Section G and section H, to form the bottom of the pocket between sections C and hidden section E. In this way, the backside section IB and Section JB are exposed forward. FIG. 8 shows a card K inserted into the pocket.

Figures 10, 11, 12, 13:
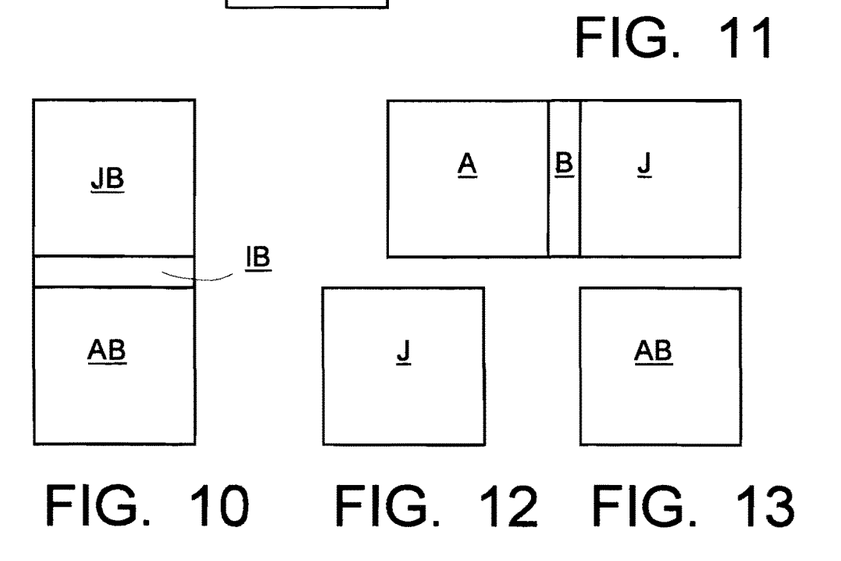
FIG. 10 is a diagram showing the third step in forming the first version of the first gift proxy from the card stock shown in FIG. 7.
FIG. 11 is a diagram showing the third step in forming the second version of the first gift proxy from the card stock shown in FIG. 7.
FIG. 12 is a diagram showing the fourth step in forming the first version of the first gift proxy from the card stock shown in FIG. 7.
FIG. 13 is a diagram showing the fourth step in forming the second version of the first gift proxy from the card stock shown in FIG. 7.

FIG. 10 shows one way that the gift proxy can be completed. In this first version, starting with FIG. 9, folds are made between Section A and Section B and between Section B and Section C, so that section is folded over the remainder of the card thereby exposing the backside section AB.

In this first version, FIG. 12 shows the final result of section JB being folded at the fold line between Section JB and Section IB, and between Section IB be and HB, so that Section JB folds down over the rest of the gift proxy, thereby exposing Section J forward. Section J. might bear an image of gift wrapping and ribbons or such accessories may be added to make the gift proxy look like a wrapped gift. In the preferred embodiment, this example of a final package would be three to 8 inches on a side and an eighth to ¾" in thickness. Package design and dimensions are subject to the discretion of the retailer.

In a second version shown in FIG. 11, starting from FIG. 9, Section JB is folded down over the rest of the card thereby exposing section J forward.

Then, in FIG. 13, Section A is folded over the rest of the card thereby exposing the backside Section AB. Section a might include graphics and promotional information concerning the retailer from which the gift and the gift proxy was purchased.

Figure 14:
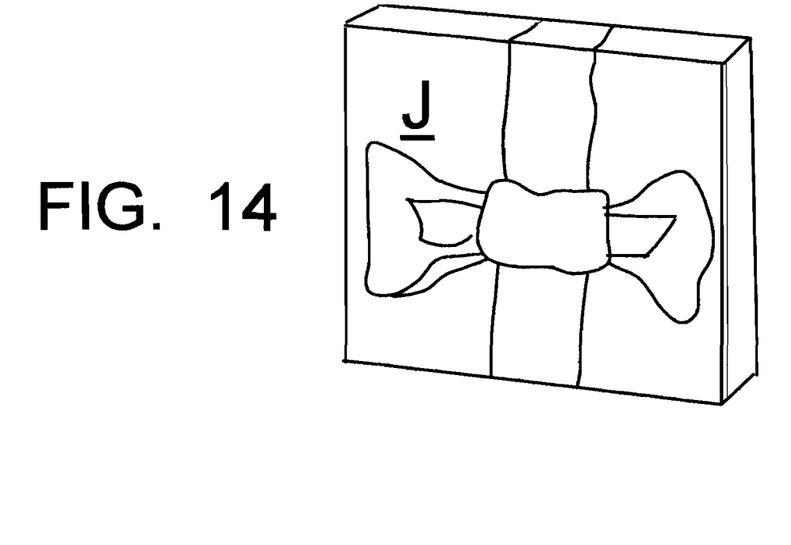
FIG. 14 is a perspective view of the closed configuration of the first version, as shown in FIG. 12, of the first gift proxy from the card stock shown in FIG. 7.

FIG. 14 shows a decorated version of the gift proxy that would result from exposing section J forward, in the final step, as shown in FIG. 12, as it might be presented as a gift proxy, with the gift package graphics exposed.

Figure 15:
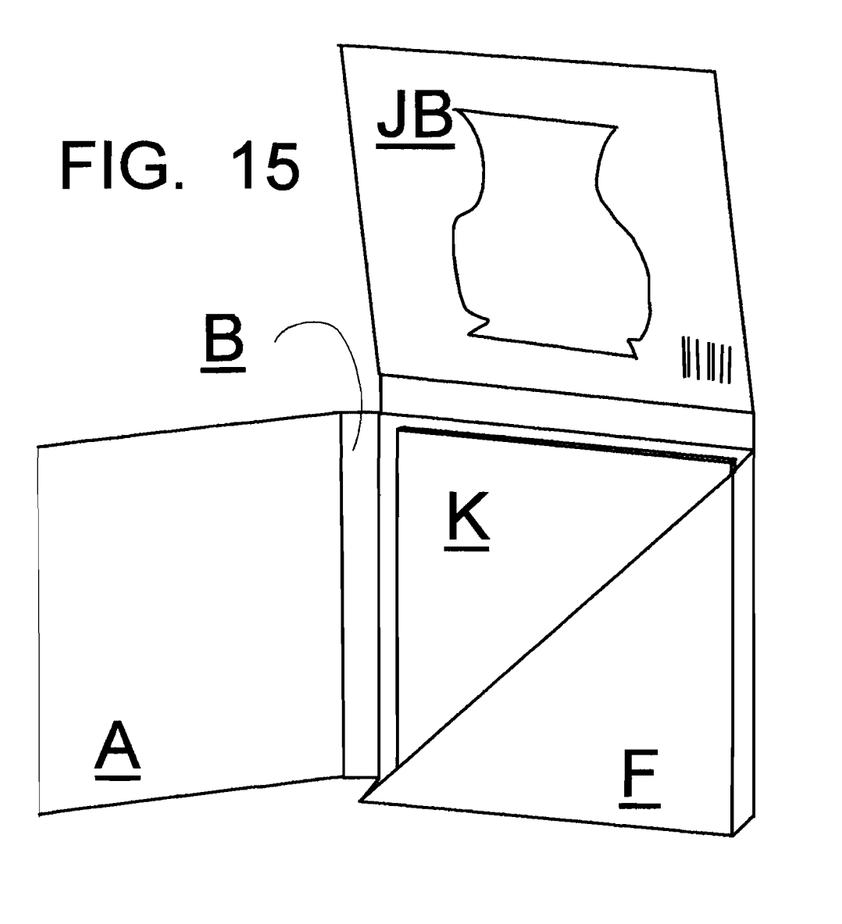
FIG. 15 is a perspective view of the open configuration of the first version, as shown in FIG. 12 in FIG. 14, of the first gift proxy from the card stock shown in FIG. 7.

FIG. 15 shows an open structure for the gift proxy presented in FIG. 9, suitable for display on a gift table or for review by event guests. In this case, the surface JB is exposed with a picture of the gift (shown as a vase) and the token (shown as a bar code) that confirms the authenticity of the gift proxy. The card K is carried in the pocket and includes instructions for redeeming the gift or other information or images. Section A might carry text or images. In the process of opening up the gift proxy, Section A would be exposed and might carry such information as the store from which the gift proxy was purchased. Section F might also carry that information.

Figure 16:
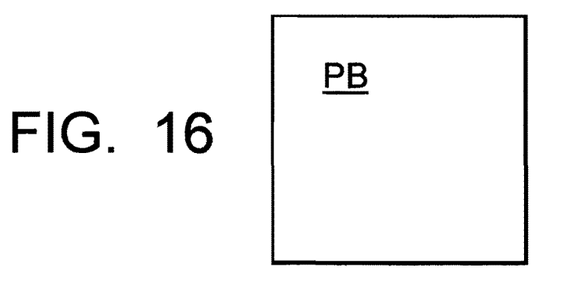
FIG. 16 is a diagram of the closed configuration of a second gift proxy embodying the principles of the present invention.
Figure 17:
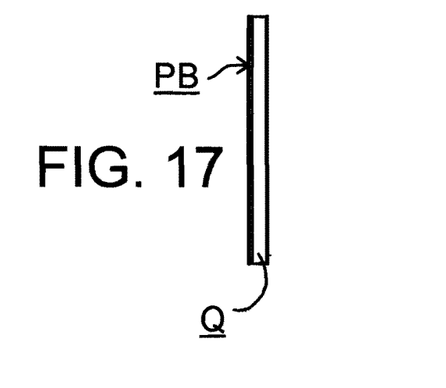
FIG. 17 is a diagram of side view of the gift proxy shown in FIG. 16.
Figures 18, 19:
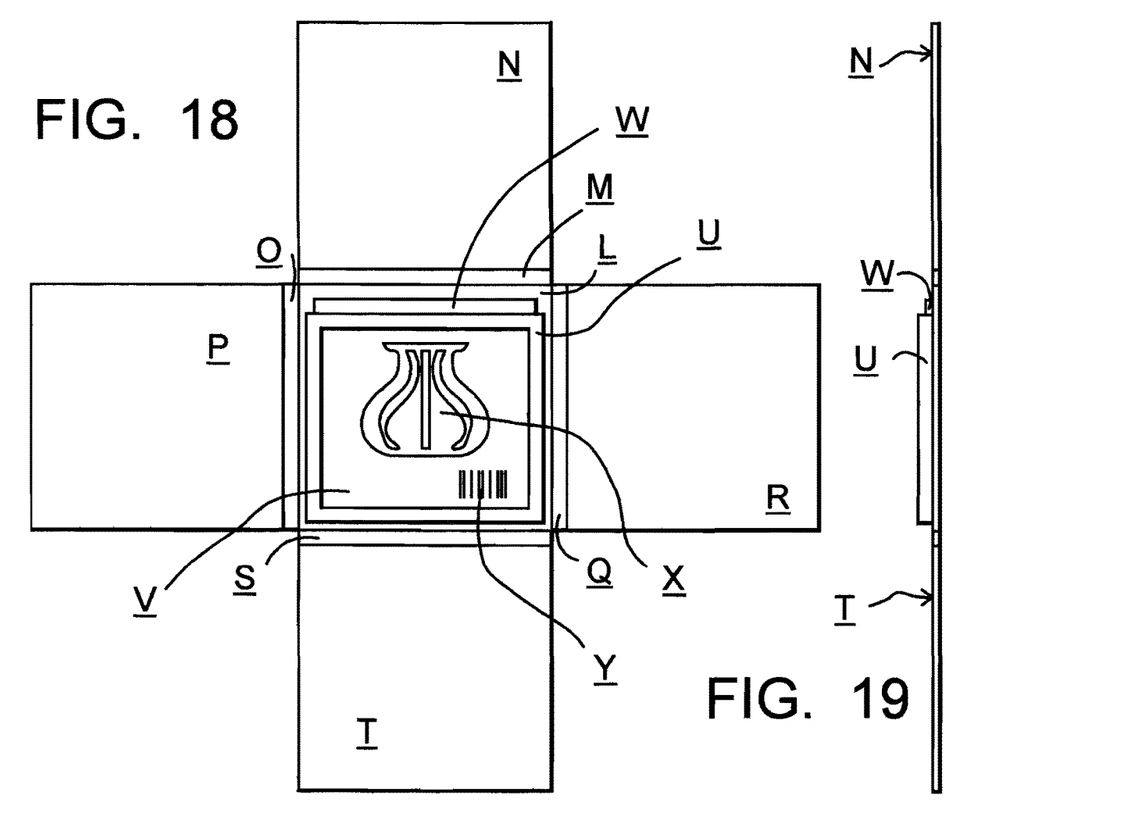
FIG. 18 is a diagram of the open configuration of the second gift proxy.
FIG. 19 is a diagram of the side view open configuration of the second gift proxy shown in FIG. 18.

Another version of the gift proxy is shown in FIGS. 16 through 19. As Shown in FIG. 18, in this embodiment, a cross-shaped card stock is divided by bend lines into a series of sections designated by a underlined letter, namely a central Section L, and four outwardly-extending arms forming sections M and N, Sections O and P, Sections Q and R, and Sections S and T. The rear side of each of the sections is designated by its corresponding underlined letter followed by an underlined B.

As further shown in FIG. 18, attached to the front of Section L is a pocket U having a large opening at the top, and a large forward facing window V that exposes the inside of the pocket U and its contents. Inside the pocket U is a card W that bears an image of the gift X and the token Y which confirms the authenticity of the gift proxy.

FIG. 19 shows a side view of the embodiment shown in as a Front Elevation View in FIG. 18. This view shows the pocket U mounted on the card stock, and shows the card W extending from the pocket U.

FIG. 16 shows the embodiment shown in FIG. 18, but with the arms folded over upon one another to cover and enclose the pocket U and the card W. Section PB is exposed forward and would normally carry gift wrapping graphics or the name of the store from which the gift proxy was purchased.

FIG. 17 shows a side view of the arrangement shown in FIG. 16. It is important to note the three dimensional character created by the folding over of the Sections M, 0, Q, and S. Section Q is shown in FIG. 17.

The benefits of various embodiments of the present invention can be summarized as follows.

The invention provides convenience of transport for destination wedding gift-giving. Eliminates issues of potential breakage, loss, cumbersome traveling with something heavy or large. Imagine having to take a gift through pre-flight security and dealing with possibility of it not fitting in x-ray screening, having to unwrap a gift to show what it is or even being deemed threatening so that it is confiscated!

The invention provides likewise, same convenience noted for traditional out-of-town weddings, showers, parties, etc.

The invention provides for usage in all categories—baby showers, engagements, weddings, house warming, Christmas or other holiday gifts—indicating versatility of idea.

Additional advantage at local weddings when storage is an issue (small condo or need to be left at parents' home). With Gift System, recipient can get the gift later where and when they want it!

The invention provides also re local weddings, eliminates need to transport gifts at the end of the affair when everyone is trying to leave. Issues of loss, breakage, not enough car transport space cited.

The invention provides for a specific gift to be selected by recipient. Connects giver to a specific gift as well.

The invention provides at the time of registering, couples can also check off if they would like to receive the gift via Gift System in addition to or as an alternative to a gift card.

The invention provides "wow" factor when presented.

The invention provides giving a gift in this format that is more secure than a gift card if automatic registration of gift and giver occurs at purchase allowing for ease to be traced if lost or stolen or even misplaced.

The invention provides redemption based on actual amount spent, just like an actual gift (including applicable local taxes) so that full amount would be realized even if redeemed for another item (vs. gift card funds which would need to be applied to taxes or would be an out-of-pocket added expense).

The invention provides for adding the savings of shipping to the purchase price, potentially resulting in a more costly gift being given.

The invention provides an option to cover shipping instead of going to the store to pick up.

The invention eliminates problems of gifts needing to be re-delivered when no one is home.

The invention provides an effective alternative when an item is out of stock or needs to be special ordered.

The invention provides that a gift in this format gives the recipient the flexibility to change her mind.

The invention provides recognition for branding opportunities and for tailoring for specific occasions via additional miniature charms (similar to wooden scoop that Williams Sonoma® includes in store wrapping).

The invention provides all information is conveniently self-contained in one place, i.e. "gift", donor, redemption info, personal note, etc.

The invention provides convenience for large group gifts (crib or furniture as an example).

The invention provides suggested usage for corporate and holiday gift giving.

The invention provides consistently reinforced aspects of the Gift System: ease/convenience.

The invention provides nice presentation.

The invention provides versatility.

The invention provides personalization.

The invention also provides a very important benefit in the case of gifts which are very large, bulky, or difficult to transport. It might be inconceivable for a gift giver to travel to a gift-giving event with a bedroom set including large pieces of furniture or a complete set of dishes or crystal. With the benefit of the present invention, the gift giver could travel to the event with the gift proxies for very large gifts and present the gift proxies in a simple and convenient manner. A variation on this benefit could be that a group of people could get together and purchase significantly larger item or parts of larger gifts. Each could transport and present a gift proxy for the specific piece that that giver elected to give.

The value of this "big item" benefit is provided to all parties involved in the transaction. The gift giver is thereby allowed to choose from a much broader universe of potential gifts, such as large furniture, appliances, or structures such as kitchen cabinets, sporting goods, or power tools, many of which might be perceived as much more desirable gifts than the typical easily-transportable kinds of gifts. The vendor is able to offer the gift giver a whole new universe of potential gifts which might be much more exciting and have much larger profit margins and profits than the typical easily transportable kinds of gifts, so the defender can actually make more money and create a more favorable customer experience. Finally, the gift recipient might find the kinds of gifts presented in this new universe of potential gifts to be much more appropriate, practical, and valued then many of the typical easily-transportable kinds of gifts that are currently often chosen by logistical considerations.

NON-LIMITING EXAMPLE—THE OLD WAY: Melissa grew up in Massachusetts, Mike was a California boy. After meeting in graduate school in Miami, Coconut Grove, Fla. was to become their new place of residence once they were married.

Melissa's maid of honor, attending law school in Chicago, planned the first bridal shower there. This worked out well because a large group of the bride's friends came from the Midwest where she attended college as well as Mike's grandmother, sister, and some aunts and cousins. The wedding was to take place in the bride's hometown of Worcester, Mass. where family and friends planned a second shower.

Mike and Melissa registered at all the popular retail stores: Crate & Barrel®, Williams Sonoma®, Tiffany's®, Bloomingdale's®, and Pottery Barn®. Their list was extensive and covered everything from furniture and small appliances to dishes and cookware.

The boxes were piled high after the Chicago shower. Melissa's mom was given the task to haul them back to Worcester and temporarily store them in her home. This was not an easy or enjoyable task, especially traveling alone by airplane back to Massachusetts. Fortunately, none of the items were lost, broken or stolen in transit. The pile was even higher after the Worcester party, but a least the presents were being moved to a nearby location.

Then came the wedding. Gifts poured in from all over the country: Kitchenaid® mixer from Aunt Jane in L.A., a full set of dishes from Midwest sorority sisters, professional pots and pans from Aunt Rae in Sarasota, on and on, all delivered to the bride's parent's home in Worcester where the wedding was to take place. No gifts were being sent to Coconut Grove as the newlyweds were in the process of buying a home, and there was no storage room in their tiny apartment.

After their beautiful wedding, Mike and Melissa headed off to the Greek Isles for their honeymoon. Obviously, they had no intention of taking their gifts with them since they were not going directly back to Florida. Mom declared that she would go bankrupt if she had to pay for shipping the 100+ presents. Melissa said, "No problem. While we are on our honeymoon, you and dad can return all of the gifts. Since all the stores where they were purchased also have locations in our area, we will re-purchase all the same gifts with credits from the exchanges."

Mom and dad spent hours and hours repacking the presents, loading the car (multiple times!), driving to all the separate store locations, waiting for price checks, and finally receiving thousands of dollars of credits for the merchandise returned. There's got to be a better way . . . and there is.

Mike's best friend from college, Trevor, lives in Salt Lake City. He was really looking forward to coming to his buddy's wedding and wanted to buy a beautiful gift for the occasion. He went directly to Crate & Barrel® where he knew the happy couple had registered.

After a salesperson escorted him to the registry computer (a fixture in every retail store across the country), he keyed in their names and the day of their wedding and voila! up came their selections complete with pictures and prices. Wow, he couldn't take his eyes off the bright red Italian cappuccino maker and decided it was the perfect gift. But after finding out that it weighed 35 pounds, it no longer seemed like a good idea when he thought of having to lug it along with all the other things he needed for the trip.

THE NEW WAY: When he expressed his concern to the salesperson she said, "No problem. Get them a Gift Proxy instead."

With that, she took his credit card (with his permission) entered his selection and within 3 minutes out came what appeared to be a glossy card-stock sheet imprinted with a gorgeous full-color image of the cappuccino machine, serial numbers, UPC code, redemption information and an area on which to write a personal message each in distinct segments. After Trevor wrote his good wishes in the space provided, the salesperson neatly made folds along the edges to encapsulate the gift information and so that the reverse side, bearing the distinctive Crate & Barrel® font, became the exterior of the container.

It was amazing—the slender hand-held package had the distinctive look of a Crate & Barrel® gift box. Before she sealed it, she showed him how the bride and groom would open the Gift Proxy and how his gift and message would appear. "This is fantastic," he said. "They get exactly the gift that they want and I don't have to schlep it on two planes across the country." As he slipped the trim package into his coat pocket he thought to himself, "Now I can even take my golf clubs."

Trevor realized that he could use a Gift Proxy for the golf clubs he wanted to get his Dad in Florida for Father's Day. Trevor also realized that he could use a Gift Proxy for the canoe he wanted to give his brother when his brother graduates from the University of Colorado. End of example.

Another aspect of this invention involves an on-line shopping and gift system, and more specifically, a method to improve on-line shopping and gift giving.

This section describes how the new shopping and gift system works for eCommerce. The process is not limited to gifts and can support any sales transaction of goods and/or services that requires flexibility in delivery location and or time.

Introduction: The traditional sales process for both in-store and on-line involves a buyer and a seller that engage in a sales transaction. The transaction includes two phases: order and fulfillment. Buyers are involved in the first phase (order) while sellers have to complete the fulfillment phase. Sometimes fulfillment is delayed because of inventory issues, need for customization, or other reasons, but in general, sellers start fulfillment as soon as an order is placed and try to complete it with minimum or no delay.

This section describes a new method for on-line shopping of any product and for gift giving that allows customers to delay fulfillment and/or customize the fulfillment (not just the product) according to their needs.

Proposed system: The proposed on-line shopping and gift system changes and improves the current sales process by allowing a buyer to place an order without triggering the fulfillment phase. The decision about when to fulfill the order, how to fulfill it (shipping or pickup), and the delivery address (if needed) can be delayed, and therefore, no fulfillment information is required at the time of ordering. The missing information is provided in a future time by the buyer or a third party chosen by the buyer when they are ready to take delivery.

The new on-line shopping and gift system achieves new functionality by introducing the following changes to the current on-line shopping process. First, in some embodiments of the system, the system can be adapted to define "Order" and "Fulfillment" as sequential, but separated processes. Second, in some embodiments of the system, the system can be adapted to allow "Orders" with incomplete "Fulfillment" information. Third, in some embodiments of the system, the system can be adapted to introduce order deactivation and reactivation. Fourth, in some embodiments of the system, the system can be adapted to allow the buyer to determine the time and place of delivery and provide it as an input to the fulfillment process after placing the order. Fifth, in some embodiments of the system, the system can be adapted to introduce a secure and safe mechanism to transfer control of the order from a buyer to a receiver and to re-activate orders. Sixth, in some embodiments of the system, the system can be adapted so that the Seller would be able to authenticate a returning buyer (or a gift receiver) and reactivate an order. Seventh, in some embodiments of the system, the system is adapted to allow integration of on-line and in-store services.

On-line shopping and other eCommerce implementations: An on-line shopper collects items into a virtual shopping cart that he or she takes to checkout. During checkout, the eCommerce server lets the shopper customize items (example: adding gift wrap), calculates the total amount for the order, and collects billing and shipping information.

The new on-line shopping and gift system lets the shopper complete customization, provide billing information, and choose between "Complete now" and "Complete later" options during the checkout.

If a shopper selects "Complete now", all shipping information (or store selection for "store pickup") is required. However, if the shopper chooses "Complete later", delivery method, shipping address, and other fulfillment information is not required at that time. Instead, the on-line shopping and gift system saves the order for future activation and starts a new process of order tracking and re-activation.

On-line order tracking and reactivation: Order tracking and re-activation works according to seller's policy. For example, if a seller decides an order must be completed within 60 days, the system will keep a record of order date, expiration date, and will send an alert before expiration.

The first action for the on-line order tracking and re-activation is to generate and share with the buyer a simple but secure method for re-activating the order. For example, the system assigns an order number and a password that will be used to activate the order. The information is presented to the buyer on the screen as "order confirmation" and it can be also delivered via email. Future activation of the order can be done by the buyer or by a third party the buyer authorizes to complete the order.

At the time of re-activation (by the buyer or a third party) all missing information must be provided so the seller can fulfill the order with no further delay.

The on-line order tracking and reactivation is unique to the on-line process. In-store shoppers get a gift representation (facsimile) that may include a unique code (with a bar code), a water mark, a hologram, and other security features that help sellers authenticate a gift at the time of redemption. For online shoppers the system must include digital security and authentication procedures that work even if the entire process is completed on-line and buyers (or gift receivers) never visit a store.

Enhancement to the on-line shopping and gift system: When this new on-line system is implemented to support gift giving or other transaction of goods and/or services, it can be enhanced in a number of different ways. For example, an embodiment of this system might be adapted so that a confirmation email to buyer may include a greeting card with the item(s) pictured and other graphics so the buyer can customize and print it. An embodiment of the system may be adapted so that a seller may email a gift message on behalf of the buyer with a customized graphics and/or animation that presents gift giving. An embodiment of this system might be adapted so that a seller can create a gift representation (facsimile) like the one given to in-store shoppers and send it to the buyer for delivery in person, or directly to the gift receiver. An embodiment of the system might be adapted so that order confirmation can be delivered to cell phones, PDA's and other capable devices. An embodiment of the system might be adapted so that stores may allow for integration of physical and virtual processes to match buyer's preferences. For example: An on-line shopper may select to pickup a gift facsimile at the local store. Another example: a receiver of a gift that was purchased on-line to be shipped may choose to complete the transaction in a store.

These examples are used to illustrate how a seller may customize the system to meet business needs. They don't represent all customization and enhancement options.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

1. A method by which a buyer can acquire a specific buyer-selected gift from a vendor and provide the gift to a recipient, who may be the buyer, comprising:
   a. the buyer purchasing a specific buyer-selected gift from a vendor, but the vendor does not provide the specific buyer-selected gift to the buyer,
   b. the buyer selecting a gift proxy design from a plurality of gift proxies, said gift proxies being designed to convey the concept of the specific buyer-selected gift,
   c. the vendor producing for the buyer said gift proxy of the design selected by the buyer, said gift proxy comprising:
      i. a gift indicia, including a miniaturized representation of the gift,
      ii. a vendor indicia, that provides an indication of an identity of the vendor, and
      iii. a token comprising an authenticating indicia that includes information that confirms authenticity of the gift proxy,
   d. the vendor providing the buyer with the gift proxy,
   e. the buyer delivering the gift proxy to the recipient,
   f. the recipient contacting the vendor
   g. the recipient presenting the token to the vendor,
   h. the vendor authenticating the token and confirming authenticity of the gift proxy,
   i. the recipient arranging to receive the specific buyer-selected gift from the vendor, and
   j. the recipient receiving the specific buyer-selected gift from the vendor,
   wherein the gift indicia is adapted to be easily interconverted from a flat form, which includes the gift indicia on a printable sheet oriented so that the flat form has a thickness dimension of between ⅛ inches and ¾ inches, and has height and width dimensions that are each between 3 inches and 8 inches, and has a total volume that is minimized, and suitable for being transported efficiently, to a three-dimensional form, wherein the gift proxy forms a free-standing display of the gift indicia.

2. The method according to claim 1, wherein the gift indicia is a two-dimensional representation of the gift.

3. The method according to claim 1, wherein the gift indicia is a three-dimensional representation of the gift.

4. The method according to claim 1, wherein the gift indicia is a pop-up card.

5. The method according to claim 1, wherein the gift indicia is a decorative card with a photo or graphic image of the gift.

6. The method according to claim 1, wherein the gift indicia is a holographic image of the gift.

* * * * *